United States Patent
Metz

(10) Patent No.: US 9,896,957 B2
(45) Date of Patent: *Feb. 20, 2018

(54) EXHAUST-GAS TURBOCHARGER

(71) Applicant: BorgWarner Inc., Auburn Hills, MI (US)

(72) Inventor: Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/442,754

(22) PCT Filed: Nov. 14, 2013

(86) PCT No.: PCT/US2013/069971

§ 371 (c)(1),
(2) Date: May 14, 2015

(87) PCT Pub. No.: WO2014/081602

PCT Pub. Date: May 30, 2014

(65) Prior Publication Data

US 2015/0292350 A1 Oct. 15, 2015

(30) Foreign Application Priority Data

Nov. 23, 2012 (DE) .................. 10 2012 022 930

(51) Int. Cl.
- *F01D 17/16* (2006.01)
- *F02B 37/24* (2006.01)
- *F02C 6/12* (2006.01)

(52) U.S. Cl.
CPC ............ *F01D 17/165* (2013.01); *F02B 37/24* (2013.01); *F02C 6/12* (2013.01); *F05D 2220/40* (2013.01); *Y02T 10/144* (2013.01)

(58) Field of Classification Search
CPC . F02B 37/24; F01D 5/02; F01D 17/16; F01D 17/165; F01D 25/16
(Continued)

(56) References Cited

U.S. PATENT DOCUMENTS

2006/0112690 A1 6/2006 Hemer
2008/0240906 A1 10/2008 Barthelet et al.
(Continued)

FOREIGN PATENT DOCUMENTS

EP 1564380 A1 * 8/2005 ........... F01D 17/165
WO 2011066130 A2 6/2011
(Continued)

OTHER PUBLICATIONS

International Search Report in International Application No. PCT/US2013/069971, dated Feb. 13, 2014.

*Primary Examiner* — Patrick Maines
(74) *Attorney, Agent, or Firm* — Eric L. Doyle; Stephan A. Pendorf; Patent Central LLC

(57) ABSTRACT

An exhaust-gas turbocharger (1) having a turbine (2) which has a turbine wheel (3) surrounded by an inflow duct (4), and having a VTG cartridge (5), which VTG cartridge has a disc (6) and a vane bearing ring (7), which delimit the inflow duct (4), and which VTG cartridge has a multiplicity of vanes (8) which are arranged in the inflow duct (4) and which are mounted in the vane bearing ring (7) by way of rotatable vane shafts (9), which vane shafts are connected to vane levers (10), the lever heads (11) of which engage into associated grooves (12) in an adjusting ring (13) which surrounds the vane bearing ring (7) on the outside; and having a radial bearing between the adjusting ring (13) and the vane bearing ring (7). Two min-flow stops (25, 26) are arranged, with a selectable angular spacing (α) with respect to one another, on the vane bearing ring (7).

8 Claims, 4 Drawing Sheets

Figure 1:
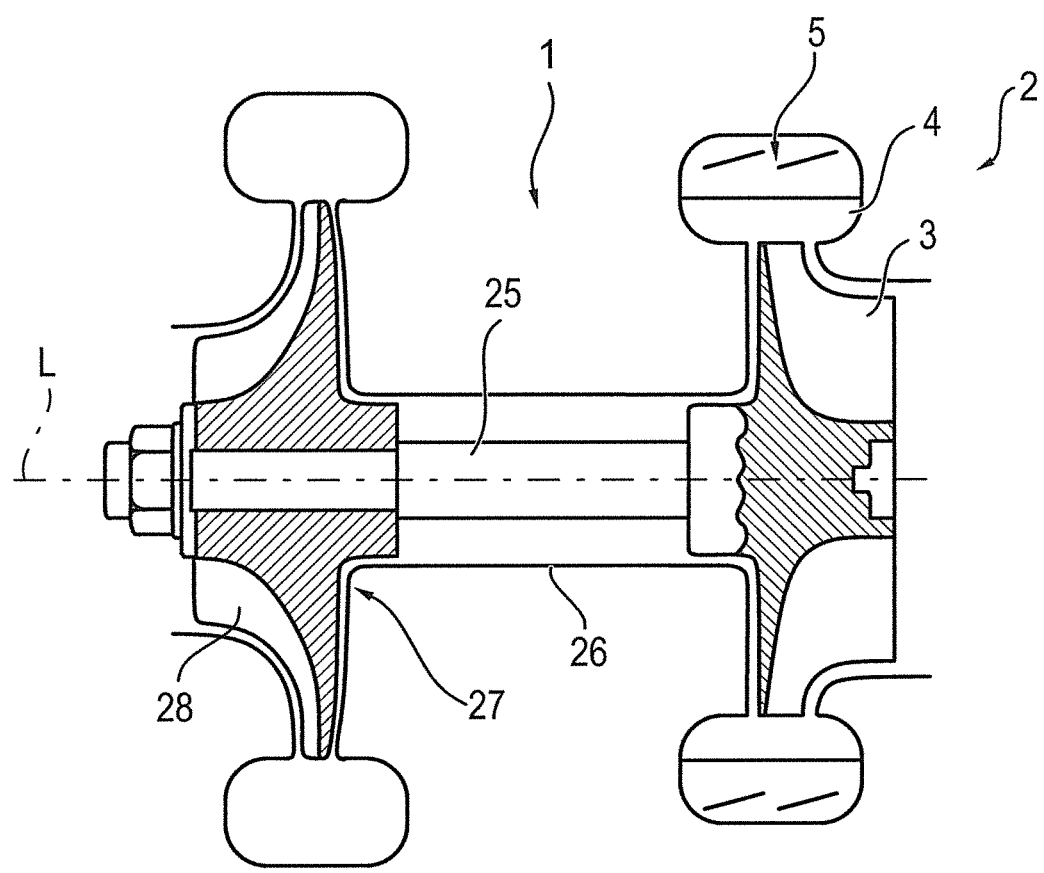

(58) Field of Classification Search
USPC .......................................... 415/159; 60/608
See application file for complete search history.

(56) References Cited

U.S. PATENT DOCUMENTS

| | | |
|---|---|---|
| 2010/0014961 A1 | 1/2010 | Boening et al. |
| 2010/0310359 A1* | 12/2010 | Valin .................... F01D 17/165 |
| | | 415/160 |
| 2011/0123316 A1* | 5/2011 | Roberts ................ F01D 17/167 |
| | | 415/160 |
| 2011/0182717 A1 | 7/2011 | Tries et al. |
| 2015/0132112 A1* | 5/2015 | Metz .................... F01D 17/165 |
| | | 415/159 |
| 2015/0292350 A1* | 10/2015 | Metz ...................... F02B 37/24 |
| | | 415/148 |

FOREIGN PATENT DOCUMENTS

| WO | WO 2011146555 A2 * | 11/2011 | .......... F01D 17/165 |
|---|---|---|---|
| WO | WO 2012047527 A2 * | 4/2012 | .......... F01D 17/165 |

* cited by examiner

EXHAUST-GAS TURBOCHARGER

The invention relates to an exhaust-gas turbocharger according to the preamble of claim 1.

In the case of such an exhaust-gas turbocharger, provision is made of a variable turbine geometry (VTG), in which guide vanes are adjusted by means of an adjusting ring. When an exhaust-gas turbocharger of said type with a variable turbine geometry is used in a vehicle, it is highly crucial to attain precise calibration, which remains stable over the service life of the engine, of the lowest possible exhaust-gas throughput ("min-flow throughput").

In this regard, it is an object of the present invention to provide an exhaust-gas turbocharger of the type indicated in the preamble of claim 1 which permits precise calibration, which remains stable over the service life of the turbocharger, of the lowest possible exhaust-gas throughput.

This object is achieved by the features of claim 1.

Tests performed within the context of the invention have shown that the throughput through the variable turbine geometry is dependent not only on the provision of a stop but also on the mounting of the adjusting ring and in particular on the magnitude of the radial play in said mounting.

Therefore, according to the invention, use is made of two min-flow stops which are preferably arranged at the greatest possible distance from the inner lever of the variable turbine geometry and which yield the advantage that the angular position of the adjusting ring in the position at the min-flow stop is precisely defined owing to small radial deflection, and any wear on the adjusting ring bearing no longer has an influence on the lowest possible exhaust-gas throughput (min-flow throughput).

The dependent claims contain advantageous developments of the invention.

It is preferable for the two min-flow stops provided according to the invention to have parallel stop edges, such that, at the min-flow stop, the adjusting ring is subjected to definite constriction in terms of its freedom of movement. Any other remaining possible displacements then no longer result in a change in throughput, or no longer result in a significant change in throughput.

Claims 4 and 5 define a VTG cartridge according to the invention as an object which can be marketed independently.

Figure 2:
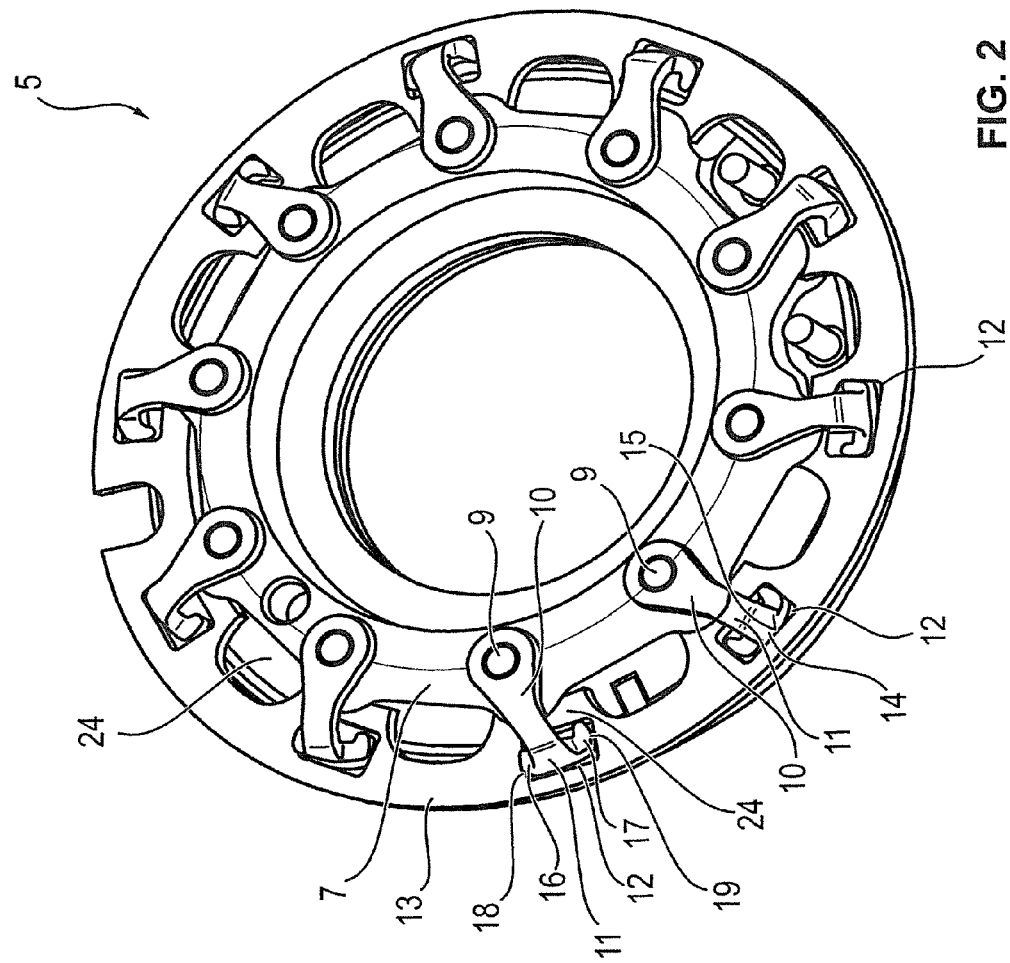
Figure 3:
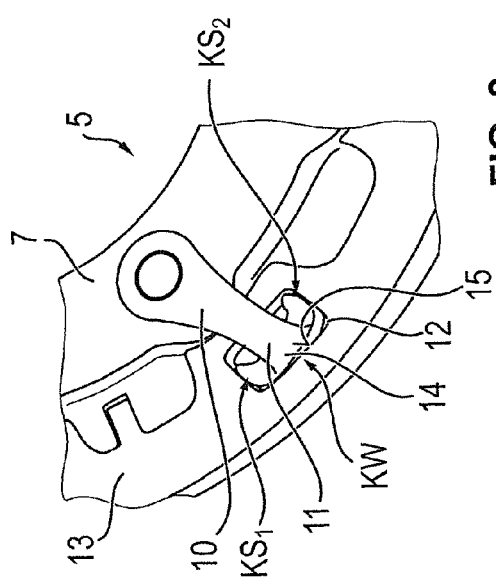
Figure 4:
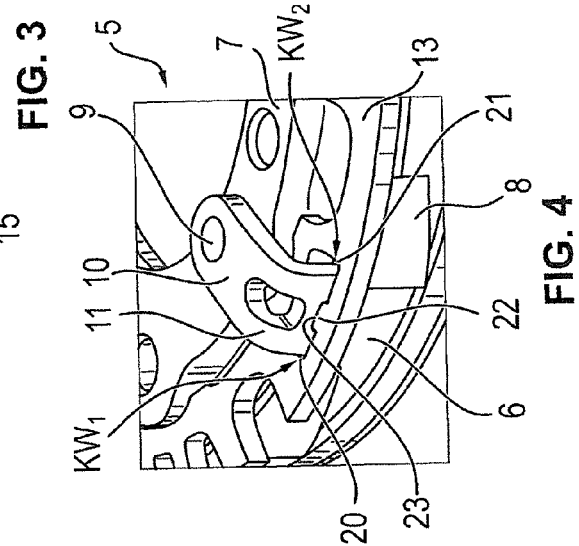
Figure 5:
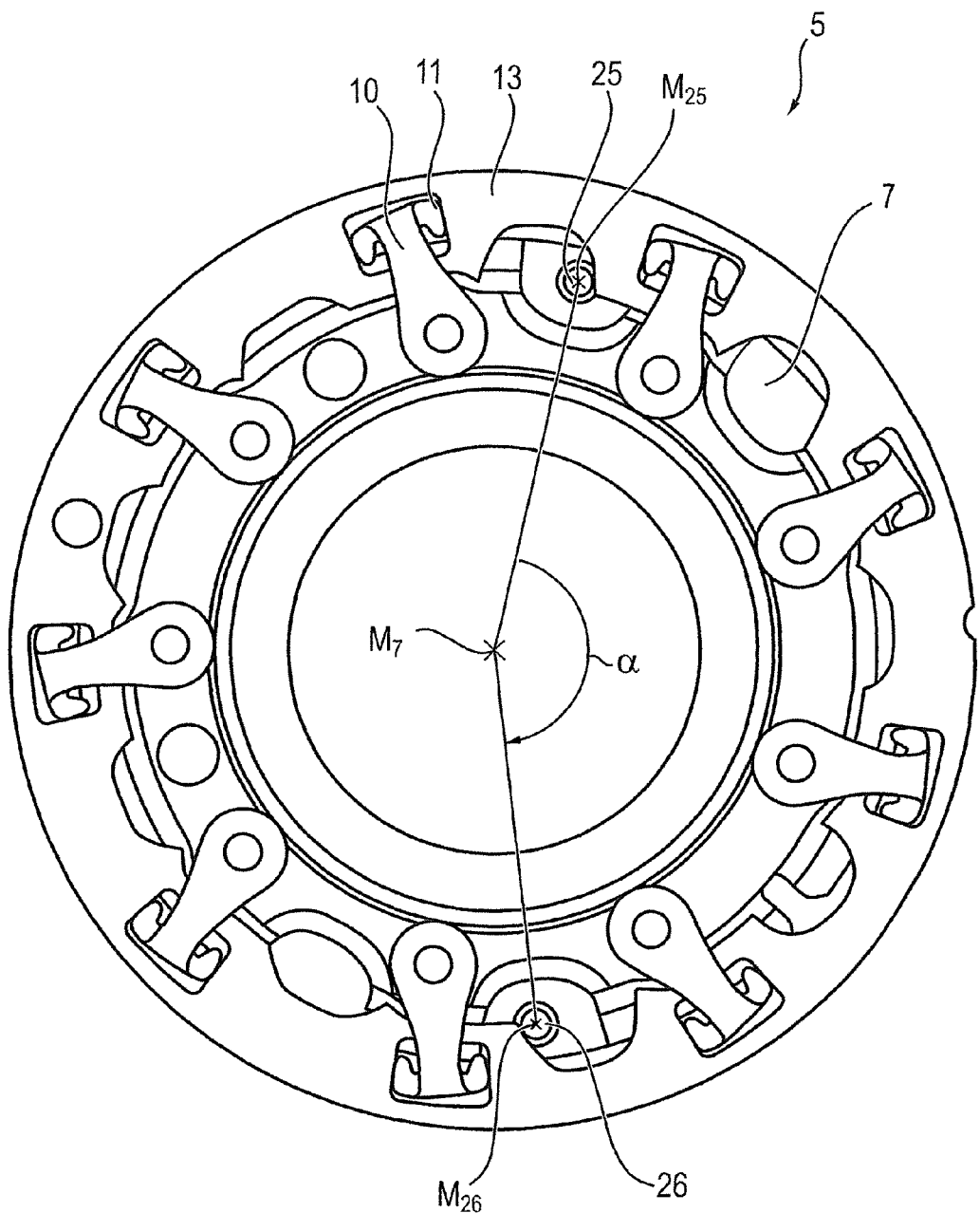
Figure 6:
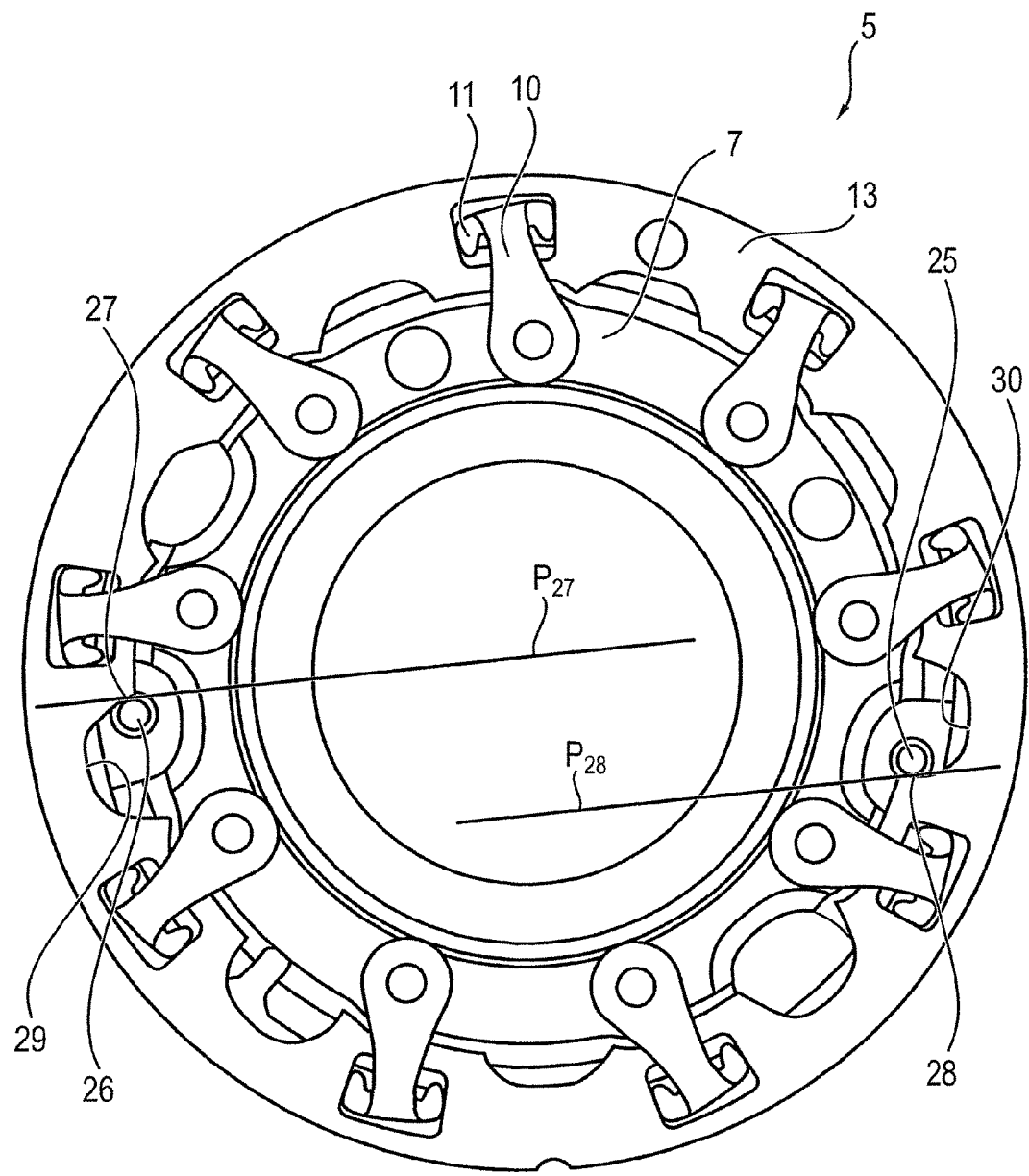

Further details, features and advantages of the invention become apparent from the following description of exemplary embodiments with reference to the drawing, in which:

FIG. 1 shows a schematically greatly simplified illustration of an exhaust-gas turbocharger according to the invention, FIG. 2 shows a perspective plan view of a VTG cartridge, FIG. 3 shows an enlarged partial view of the VTG cartridge according to FIG. 2, FIG. 4 shows a partial illustration, corresponding to FIG. 3, of a VTG cartridge (stops not visible), FIG. 5 shows a view from below of the VTG cartridge according to the invention, and FIG. 6 shows a view from below, corresponding to FIG. 5, of the VTG cartridge according to the invention, for explaining the parallel configuration of stop edges.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an inflow duct 4 which is provided with a so-called VTG cartridge 5.

This VTG cartridge 5 will be described in detail hereinbelow with reference to FIGS. 2 to 4.

The exhaust-gas turbocharger 1 also of course has all the other common parts of an exhaust-gas turbocharger, such as a rotor 25, which is mounted rotatably in a bearing housing 26 and which bears the turbine wheel 3 at one end and a compressor wheel 28 of a compressor 27 at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a disc 6, delimits an inflow duct 4 for the passage of exhaust gases to the turbine wheel 3. Furthermore, a VTG cartridge of this type has a plurality of vanes, which are arranged in the inflow duct 4 and of which FIG. 4 shows one vane designated 8 as a representative example of all vanes bearing the corresponding reference numeral. The vanes 8 can be moved rotatably in the vane bearing ring 7 between a closed and an open position. For this purpose, the vanes 8 have vane shafts 9 each having an axis of rotation. The vane shafts 9 in turn are connected to vane levers 10, of which two vane levers are denoted in each case in FIG. 2 with the reference numeral 10. As FIG. 2 shows, the embodiment shown there has ten such preferably cranked vane levers, in each case of identical design.

Each vane lever 10 has a lever head 11, which engages into an associated groove 12 in an adjusting ring 13. FIG. 2 shows in this respect that the adjusting ring 13 surrounds the vane bearing ring 7 on the outside, i.e. along the outer circumference thereof.

For the radial mounting of the adjusting ring 13, provision is made of a radial bearing, which is formed by the vane levers 10. For this purpose, the vane levers 10 are formed as rolling levers, the lever heads 11 of which are supported in the grooves 12 in the adjusting ring 13.

In FIGS. 2 and 3, the lever heads 11 are provided with end faces 14 each with a rounded form. These rounded end faces 14 are in rolling contact with a counterface 15 of the respectively associated groove 12, this rolling contact being symbolized by the arrow KW in FIG. 3.

In the embodiment shown in FIGS. 2 and 3, the counterface 15 of the grooves has a planar form in each case.

The two further arrows $KS_1$ and $KS_2$ in FIG. 3 show lateral contact points between the lever head 11 and the respectively associated groove 12. These contact points $KS_1$ and $KS_2$ arise between side walls 16 and 17 of the lever heads 11 and the corresponding associated side walls 18 and 19 of the grooves 12, these side walls 18 and 19 each adjoining the counterface 15. As shown in FIG. 2, the grooves 12 are each closed by a rear wall 24, which in turn adjoins the side walls 18 and 19 and runs substantially parallel to the counterface 15.

FIG. 4 shows an embodiment in which the preferably cranked vane levers 10 are in turn in the form of rolling levers, the lever heads 11 of which are supported in the grooves 12, but this support being provided at lateral rolling bearing support points $KW_1$ and $KW_2$, as is evident in detail from FIG. 4. These rolling bearing support points $KW_1$ and $KW_2$ of the lever heads 11 are supported on edge regions 20, 21 of the grooves 12, as is likewise evident from FIG. 4.

Furthermore, the lever heads 11 in this embodiment each have a central recess 23, into which an associated lug 22 of the adjusting ring 13 engages, as a result of which the force is transmitted for the adjustment of the vanes.

It is common to both embodiments that the vane levers 10 are each in the form of preferably cranked levers and can be produced in the form of stamped or formed parts.

Furthermore, in both embodiments the adjusting ring 13 is axially mounted by way of the vane bearing ring 7. For this purpose, the vane bearing ring 7 has bearing segments 24 (see FIG. 2), which rest on the adjusting ring 13.

FIG. 5 shows a perspective view from below of the VTG cartridge 5 according to the invention, said view showing the arrangement of two stops 25, 26 for setting a lowest possible throughput through the cartridge 5, said stops 25 and 26 normally being referred to as "min-flow stops".

As shown in FIG. 5, the min-flow stops 25 and 26 are arranged on the vane bearing ring 7. As viewed from the central point $M_7$ of the vane bearing ring 7 to the central points $M_{25}$ and $M_{26}$ of the min-flow stops, said min-flow stops 25 and 26 enclose an angle α with respect to one another, which angle may be freely selected from a design aspect in accordance with structural conditions or other demands.

In a further embodiment illustrated in FIG. 6, the stop edges 27, 28 on the adjusting ring 13 are formed so as to be parallel, such that, when they make contact with the min-flow stops 25, 26, no significant radial deflection of the adjusting ring 13 is generated and thus the coaxial position with respect to the vane bearing ring 7 is maintained. Here, the stop edges 27 and 28 are those stop edges of the adjusting ring recess 29 and 30 respectively which come into contact with the min-flow stops 25 and 26 respectively, as can be seen in detail from FIG. 6. The parallel configuration of said stop edges 27 and 28 is indicated in FIG. 6 by the parallel lines $P_{27}$ and $P_{28}$.

In addition to the above written disclosure, reference is hereby explicitly made to the illustrative representation of the invention in FIGS. 1 to 5 to supplement the disclosure of the invention.

LIST OF REFERENCE SIGNS

1 Exhaust-gas turbocharger
2 Turbine
3 Turbine wheel
4 Inflow duct
5 VTG cartridge
6 Disc
7 Vane bearing ring
8 Vanes
9 Vane shafts
10 Vane lever
11 Lever heads
12 Grooves
13 Adjusting ring
14 Rounded end faces
15 Counterface
16, 17 Side walls
18, 19 Side walls
20, 21 Edge regions
22 Lug
23 Recess
24 Bearing segment
25, 26 Min-flow stops
27, 28 Stop edges
29, 30 Adjusting ring recesses
$KS_1$ and $KS_2$ Lateral contact points for the adjustment of the vanes
KW Contact point for rolling bearing
$KW_1$ and $KW_2$ Contact points for rolling bearing
L Charger longitudinal axis
$M_7$ Central point of the vane bearing ring
$M_{25, 26}$ Central points of the min-flow stops
$P_{27}, P_{28}$ Parallel lines

The invention claimed is:

1. An exhaust-gas turbocharger (1) comprising:
a turbine (2) wherein a turbine wheel (3) is surrounded by an inflow duct (4), and
a VTG cartridge (5), wherein a multiplicity of vanes (8) are arranged in the inflow duct (4) and are mounted in a vane bearing ring (7) by way of rotatable vane shafts (9), wherein the rotatable vane shafts (9) are connected to vane levers (10) having lever heads (11) engaging into associated grooves (12) in an adjusting ring (13) which surrounds the vane bearing ring (7) on the outside, whereby rotation of the adjusting ring (13) pivots the vanes (8); and
a radial bearing between the adjusting ring (13) and the vane bearing ring (7),
wherein
two min-flow stops (25, 26) are arranged, mounted on the vane bearing ring (7), each min-flow stop (25, 26) located to contact and stop rotation of the adjusting ring (13) at the position of lowest possible exhaust gas throughput of the VTG cartridge.

2. The exhaust-gas turbocharger as claimed in claim 1, wherein the min-flow stops (25, 26) are in the faun of pins.

3. The exhaust-gas turbocharger as claimed in claim 1, wherein the adjusting ring (13) has cutouts (29, 30), wherein the cutouts (29, 30) come into contact with the min-flow stops (25, 26) at a contact region, and wherein the contact regions of the adjusting ring (13) have parallel stop edges (27, 28).

4. A VTG cartridge (5) of an exhaust-gas turbocharger (1), comprising:
a disc (6) and having a vane bearing ring (7), which delimit an inflow duct (4),
a multiplicity of vanes (8), wherein the vanes (8) are arranged in the inflow duct (4) and are mounted in a vane bearing ring (7) by way of rotatable vane shafts (9), wherein the rotatable vane shafts (9) are connected to vane levers (10) having lever heads (11) engaging into associated grooves (12) in an adjusting ring (13) which surrounds the vane bearing ring (7) on the outside, whereby rotation of the adjusting ring (13) pivots the vanes (8), and
a radial bearing between the adjusting ring (13) and the vane bearing ring (7),
wherein
two min-flow stops (25, 26) are arranged, mounted on the vane bearing ring (7), each min flow stop (25, 26) located to contact and stop rotation of the adjusting ring (13) at the position of lowest possible exhaust gas throughput of the VTG cartridge.

5. The VTG cartridge as claimed in claim 4, wherein the min-flow stops (25, 26) are in the form of pins.

6. The VTG cartridge as claimed in claim 4, wherein the adjusting ring (13) has cutouts (29, 30), wherein the cutouts (29, 30) come into contact with the min-flow stops (25, 26) at a contact region, and wherein the contact regions of the adjusting ring (13) have parallel stop edges (27, 28).

7. The VTG cartridge as claimed in claim 1, wherein the radial bearing between the adjusting ring (13) and the vane bearing ring (7) is formed by the vane levers (10), which vane levers (10) are formed as rolling levers, and wherein the lever heads (11) are supported in the grooves (12) in the adjusting ring (13).

8. The VTG cartridge as claimed in claim 4, wherein the radial bearing between the adjusting ring (13) and the vane bearing ring (7) is formed by the vane levers (10) which vane levers (10) are formed as rolling levers, and wherein the lever heads (11) are supported in the grooves (12) in the adjusting ring (13).

\* \* \* \* \*